(12) United States Patent  (10) Patent No.: US 7,958,342 B1
Lane et al.  (45) Date of Patent: Jun. 7, 2011

(54) METHODS FOR OPTIMIZING COMPUTER SYSTEM PERFORMANCE COUNTER UTILIZATION

(75) Inventors: Robert M. Lane, Auburn, CA (US); Kenneth Tracton, Palo Alto, CA (US); Zenon Fortuna, El Cerrito, CA (US)

(73) Assignee: Oracle America, Inc., Redwood City, CA (US)

( * ) Notice: Subject to any disclaimer, the term of this patent is extended or adjusted under 35 U.S.C. 154(b) by 605 days.

(21) Appl. No.: 11/626,833

(22) Filed: Jan. 24, 2007

(51) Int. Cl.
*G06F 7/38* (2006.01)
*G06F 9/00* (2006.01)
*G06F 9/44* (2006.01)
(52) U.S. Cl. ........................ 712/227; 712/220
(58) Field of Classification Search .................... 712/227
See application file for complete search history.

(56) References Cited

U.S. PATENT DOCUMENTS 5,784,296 A * 7/1998 Baker et al. .................... 702/76
5,875,258 A * 2/1999 Ortyn et al. .................... 382/133
2006/0277395 A1* 12/2006 Fowles ........................ 712/227

OTHER PUBLICATIONS

UC-Davis, A First Guided Tour on the Irregular Sampling Problem, Jul. 2, 2002, pp. 1, 2, 5, 6, and 9.*
The Wayback Machine, http://www.archive.org/index.php, accessed on Jul. 15, 2009.*

* cited by examiner

*Primary Examiner* — Eddie Chan
*Assistant Examiner* — George D Giroux
(74) *Attorney, Agent, or Firm* — Martine Penilla & Gencarella, LLP

(57) ABSTRACT

A Nyquist sampling frequency is determined for performance counter events to be measured. Based on the Nyquist sampling frequencies, a schedule for measuring the performance counter events is determined. The performance counter event measurements are then conducted in accordance with the schedule, whereby the measurements yield a set of sample data for each performance counter event. A signal reconstruction algorithm is applied to the set of sample data for each performance counter event to reconstruct an essentially complete signal for each performance counter event. The essentially complete signal for each performance counter event is then used to improve either a design or a utilization of either a microprocessor or an application to be executed on the microprocessor.

20 Claims, 2 Drawing Sheets

METHODS FOR OPTIMIZING COMPUTER SYSTEM PERFORMANCE COUNTER UTILIZATION

BACKGROUND

Modern microprocessors include performance counter logic for measuring and gathering data on performance-related events of the microprocessor. For example, some microprocessors include hardware performance counters that enable counting of a series of processor events, such as cache misses, pipeline stalls, and floating-point operations, among others. Statistics of processor events can be collected through the performance counter logic with little or no overhead. Thus, performance counter logic provides a powerful means to monitor and analyze performance of the microprocessor or application executed thereon.

SUMMARY

In one embodiment, a method is disclosed for optimizing performance counter utilization. The method includes an operation for determining performance counter events to be measured. A Nyquist sampling frequency is then determined for each performance counter event to be measured. Then, using the Nyquist sampling frequency for each performance counter event, a schedule is determined for measuring the performance counter events. The performance counter event measurements are then conducted in accordance with the schedule for measuring performance counter events. The performance counter event measurements yield a set of sample data for each performance counter event. The method also includes an operation for applying a signal reconstruction algorithm to the set of sample data for each performance counter event to reconstruct an essentially complete signal for each performance counter event. An operation is then provided for using the essentially complete signal for each performance counter event to improve either a design or a utilization of either a microprocessor or an application to be executed on the microprocessor.

In another embodiment, a computer readable medium having program instructions stored thereon for optimizing performance counter utilization is disclosed. The computer readable medium includes program instructions for enabling specification of performance counter events to be measured. The computer readable medium also includes program instructions for enabling specification of a Nyquist sampling frequency for each performance counter event to be measured. Program instructions are also included for determining a schedule for measuring performance counter events using the Nyquist sampling frequency for each performance counter event. The computer readable medium further includes program instructions for conducting performance counter event measurements in accordance with the schedule for measuring performance counter events, whereby the measurements yield a set of sample data for each performance counter event. Additionally, program instructions are included for applying a signal reconstruction algorithm to the set of sample data for each performance counter event to reconstruct an essentially complete signal for each performance counter event. The computer readable medium further includes program instructions for storing the essentially complete signal for each performance counter event in a computer readable memory space.

Other aspects of the invention will become apparent from the following detailed description, taken in conjunction with the accompanying drawings, illustrating by way of example the principles of the invention.

DETAILED DESCRIPTION

Figure 1:
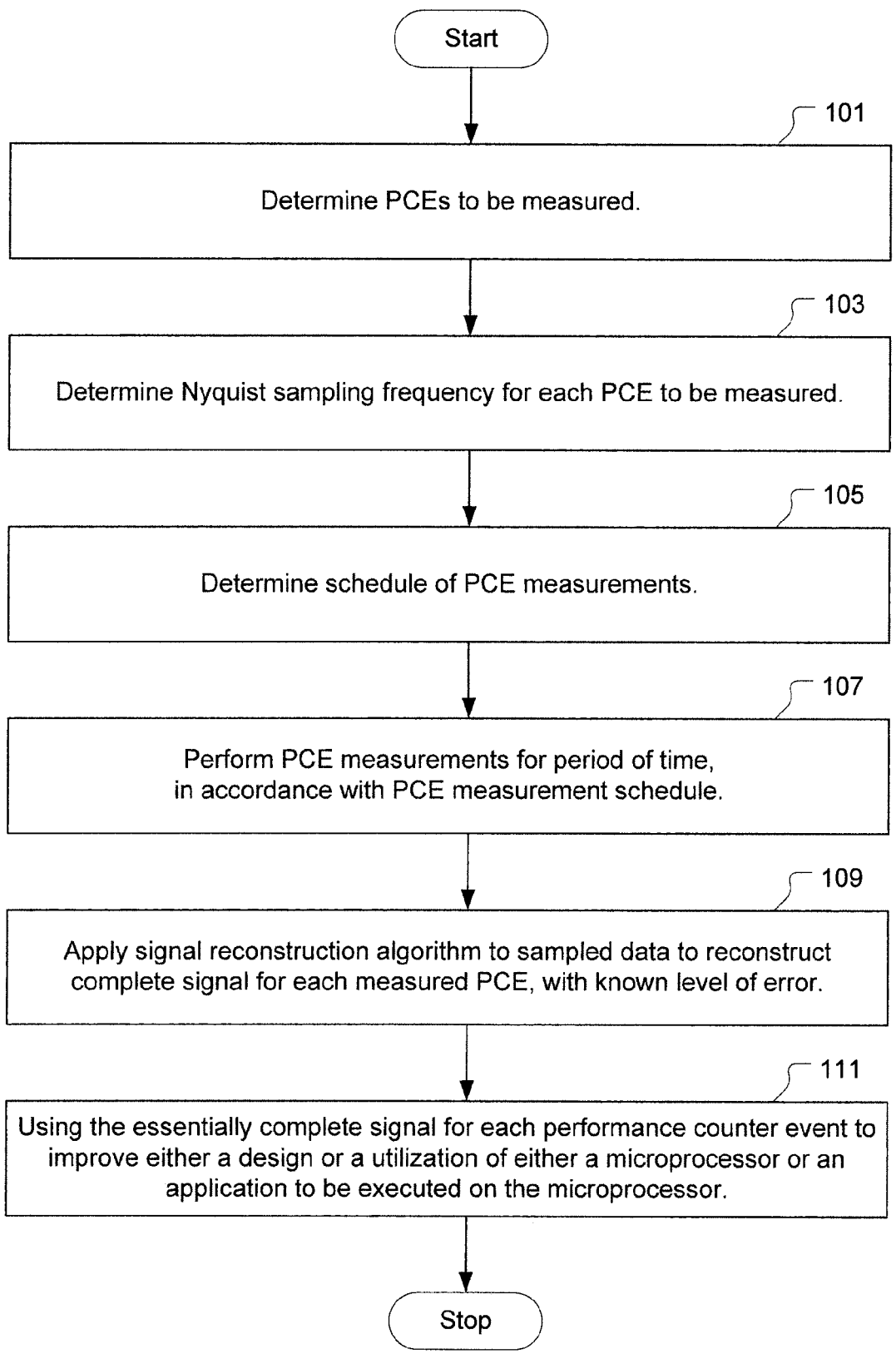
FIG. 1 is an illustration showing a method for optimizing performance counter utilization, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Within a microprocessor, performance counter logic is defined to collect data on a set of performance counter events (PCEs). Also, within a microprocessor, a number of performance counter registers (PCRs) are provided to collect the PCE data from the performance counter logic. For example, one PCE may be defined to count the number of accesses to a cache, another PCE may be defined to track the size of data packets transmitted between entities, another PCE may be defined to track the number of floating point instructions executed in an interval of time. It should be appreciated that the number and types of PCEs can extend far beyond the exemplary PCEs mentioned above. Also, as the complexity and functionality of the microprocessor increases, the number and types of PCEs desired to be measured is expected to increase.

Usually, the number of PCEs that are available to be measured within a microprocessor far exceeds the number of PCRs that are available for use at a given time. For example, the number of PCRs available for simultaneous use may be limited to one, two, four, eight, or some other quantity depending on the microprocessor design, whereas the number of PCEs available through the performance counter logic may be as large as fifty or more. Also, the number of PCEs that one may wish to simultaneously measure may far exceed the number of available PCRs. Consequently, the ability to sample the PCEs can be constrained because not all PCEs of interest can be simultaneously measured. For example, the number of PCEs that may need to be simultaneously measured to evaluate PCE dependency issues may exceed the number of available PCRs. Additionally, in some microprocessors, the performance counter logic may not allow for simultaneous measurement of the same PCEs.

When the number of PCRs is less than the number of PCEs of interest, one is required to cycle through the PCEs of interest, such that performance data for the PCEs of interest is collected in a cyclical manner. For example, in the case of two available PCRs (PCR0 and PCR1) and four PCEs of interest (PCE0, PCE1, PCE2, PCE3), PCE0 and PCE1 are measured at time 0, then PCE2 and PCE3 are measured at time 1, then PCE0 and PCE1 are measured at time 2, then PCE2 and PCE3 are measured at time 3, etc. Therefore, when the number of PCRs is less than the number of PCEs of interest, the PCRs are shared among the PCEs of interest. Consequently, the number of PCEs that can be simultaneously measured is limited to the number of PCRs. Also, because some PCEs need to be monitored over a long period of time, cycling through the PCEs of interest may take quite a long time.

To obtain access to the data present within the PCRs, it is necessary to read the content of the PCRs, and store the read content in a separate memory. The process of reading and storing the PCR content in a separate memory requires an amount of processing by the microprocessor. Therefore, if reading of the content of the PCRs occurs with sufficiently high frequency, the burden placed on the microprocessor to perform the PCR reading operations can actually influence the performance of the microprocessor that is to be measured within the PCEs. Thus, with a sufficiently high PCR reading burden, the performance monitoring process can bias itself.

The data stored in a PCR as a function of time is considered to define a signal. It should be noted that the dimension of time in the context of a microprocessor can be indexed to microprocessor cycles. Thus, data measured for a given PCE as a function of time will define a signal for the given PCE. Also, the reading of data from a PCR is equivalent to sampling the signal for the PCE whose measured data is presently stored in the PCR. It should be understood that a PCE signal which changes slowly with time will need to be sampled at a lower frequency than a PCE signal which changes rapidly with time. According to the Nyquist sampling criterion, if the sampling frequency of the signal is at least twice the maximum frequency present in the true signal, the true signal can be accurately derived, i.e., reconstructed, from the sampled signal data. The Nyquist sampling frequency is defined as twice the maximum frequency present in the true signal to be sampled. Therefore, to enable accurate reconstruction of a true signal from discrete samples taken thereof, it is necessary to discretely sample the signal at a sampling frequency that is at least as large as the associated Nyquist sampling frequency.

Given that the measurement of multiple PCEs often requires cycling of the PCEs through a limited number of PCRs, and given that the sampling rate, i.e., reading rate, of the PCRs should be limited so as to avoid self-biasing of the performance monitoring process, it is desirable to have a method for PCE measurement and sampling that optimizes the PCE data acquisition to provide the most meaningful PCE data from which microprocessor and/or application performance characterizations and dependencies can be evaluated. To this end, a method is described herein for PCE data sampling with a limited number of PCRs such that essentially complete signals associated with the sampled PCEs data can be reliably reconstructed, thus enabling the recovery of PCE data that is not explicitly sampled.

FIG. 1 is an illustration showing a method for optimizing performance counter utilization, in accordance with one embodiment of the present invention. The method includes an operation 101 for determining which available PCEs are to be measured. The PCEs to be measured are referred to as an event set. Then, an operation 103 is performed to determine the Nyquist sampling frequency for each of the PCEs within the event set determined in operation 101. Generally speaking, a sampling frequency refers to the rate at which the PCR for a given PCE is to be sampled, i.e., read. The temporal distance (which may be represented by microprocessor cycles) between adjacent sampling times is referred to as the sample interval. The maximum temporal distance between adjacent samples, i.e., between adjacent PCR reads, is referred to as the maximum sample interval. If the maximum sample interval is smaller than the interval between samples taken at the Nyquist sampling frequency, the sampled PCE data can be used to reconstruct the essentially complete PCE signal. More specifically, if the sampling rate of the PCR is at least as large as the Nyquist sampling frequency associated with the PCE signal recorded by the PCR, an essentially complete version of the PCE signal can be reconstructed from the sampled PCE data. The reconstruction of the PCE signal from the sampled PCE data may be performed using an iterative scheme that converges at a geometric rate.

The method continues with an operation 105 for determining a schedule of the PCE measurements. Scheduling of the PCE measurements includes determining which PCEs within the event set are to be measured simultaneously given the available PCRs, and how the PCEs within the event set are to be cycled through the available PCRs. In one embodiment, the number of PCEs within the event set exceeds the number of available PCRs. Thus, in this embodiment, the number of PCEs to be simultaneously measured corresponds to the number of available PCRs. In this embodiment, the PCE measurements are scheduled such that all combinations of PCEs within the event set that can be simultaneously measured are covered. In other words, the various PCEs within the event set are cycled through the PCRs such that the event set is permuted over the set of all PCE combinations that can be simultaneously measured. Permutation of the PCEs minimizes PCE data dependencies.

Also, scheduling of the PCE measurements in operation 105 includes determining the sampling interval to be applied to each PCE of interest. The sampling interval determined for a given PCE should correspond to a sampling rate that is at least as large as the Nyquist sampling frequency associated with the given PCE. In other words, the number of samples per second for a given PCE should be at least twice the anticipated number of changes in the direction of the PCE signal gradient per second. In one embodiment, the PCE sampling is scheduled to occur at regularly spaced intervals. In another embodiment, the PCE sampling is scheduled to occur at irregular intervals. PCE sampling at irregular intervals reduces the likelihood that periodicity in the reconstructed PCE signal will be masked by the discretely sampled PCE data. Regardless of whether the PCE sampling is performed at regularly spaced intervals or irregularly spaced intervals, it should be understood that each PCE sampling rate be at least as large as the associated Nyquist sampling frequency.

The method continues with an operation 107 for performing the PCE measurements for a period of time, in accordance with the PCE measurement schedule determined in operation 105. Following operation 107, the method continues with an operation 109 for applying a signal reconstruction algorithm to the sampled data to reconstruct the essentially complete PCE signal for each PCE within the event set. In one embodiment, operation 109 is performed using the Voronoi-Allebach algorithm for reconstructing a band-limited signal from a sequence of sampled signal values that are either regularly spaced or irregularly spaced. The Voronoi-Allebach algorithm is an iterative algorithm through which an accurate estimate of the complete band-limited signal can be reconstructed from a set of signal data sampled at a rate that is equal to or greater than the Nyquist sampling frequency. The Voronoi-Allebach algorithm also indicates an error level associated with the estimate of the true signal. Thus, evaluation of a PCE signal that is reconstructed using the Voronoi-Allebach algorithm will benefit from knowing the error level associated with the reconstructed PCE signal.

In the present context of PCE signal reconstruction, the Voronoi-Allebach algorithm proceeds as follows:

(a) A nearest neighborhood interpolation is performed on the sampled PCE data points to obtain estimates for the missing PCE data points. The nearest neighborhood interpolation generates a step function, with the step placed at the midpoint of the sampled PCE data points.

(b) The step function is then Fourier transformed and filtered, i.e., only Fourier magnitude coefficients are preserved and the imaginary portion is discarded.

(c) The estimate indicated above is applied and a certain portion of the remaining time series is again recovered by repeating step (b), now starting with the sampled temporal coordinates.

(d) Continuing to use the difference between the given sampling values and approximations, additive corrections are generated which lead stepwise, i.e., iteratively, to improved approximations until the desired accuracy is attained.

In other embodiments, operation 109 can be performed using the Marvasti algorithm or the adaptive weights algorithm for reconstructing a band-limited signal from a sequence of sampled signal values. Each of the Voronoi-Allebach, Marvasti, and adaptive weights algorithms represent known mathematical techniques, and are not described in detail herein to avoid unnecessarily obscuring the present invention. However, it should be understood that the Voronoi-Allebach, Marvasti, and adaptive weights algorithms have not been previously applied to reconstruct a PCE signal. Furthermore, it should be understood that other mathematical techniques not specifically identified herein may be utilized in operation 109 to reconstruct each PCE signal from the measured PCE data. The method of FIG. 1 can also include an operation 111 for using the essentially complete signal for each performance counter event to improve either a design or a utilization of either a microprocessor or an application to be executed on the microprocessor.

Each reconstructed PCE signal obtained by applying the method of FIG. 1 allows missing PCE data at a given point in time to be predicted with a known accuracy, provided that the rate of change of the PCE signal gradient is correctly estimated to enable correct calculation of the associated Nyquist sampling frequency. Also, through the method of FIG. 1, PCE data at various times, including times when the data was not directly sampled, can be correlated to analyze microprocessor and/or application performance. It should be appreciated that the method of FIG. 1 provides a reliable means of data recovery so that microprocessors with a limited number of PCRs can be utilized to generate essentially complete PCE signals that extend beyond the PCE data that can be directly sampled given the limited number of PCRs. Additionally, it should be appreciated that the method for optimizing performance counter utilization of FIG. 1, alleviates the following issues associated with performance monitoring:

PCEs of interest exceeding the number of available PCRs;
PCEs that cannot be simultaneously sampled due to microprocessor circuitry characteristics; and
correlation of PCEs that cannot be simultaneously sampled.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Figure 2:
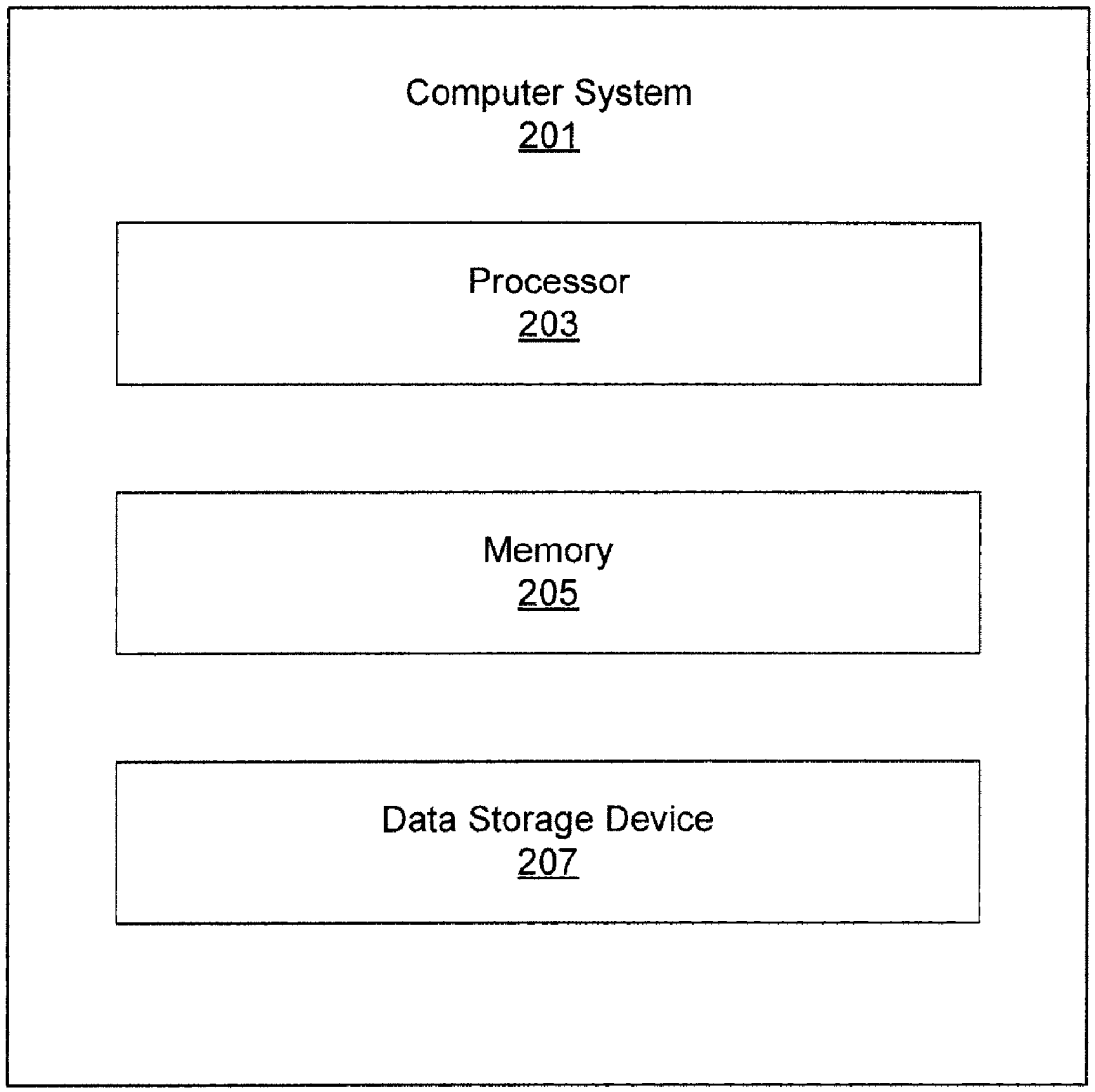
FIG. 2 shows a computer system, in accordance with one embodiment of the present invention.

Any of the operations described herein that form part of the invention are useful machine operations. The invention also relates to a device or an apparatus for performing these operations. Embodiments of the present invention can be processed on a single computer, or using multiple computers or computer components which are interconnected. FIG. 2 shows a computer system, in accordance with one embodiment of the present invention. As shown in FIG. 2, a computer, as used herein, shall include a standalone computer system 201 having its own processor 203, its own memory 205, and its own storage 207, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device (e.g., data storage device 207) that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is.

1. A method for optimizing performance counter utilization, comprising:

determining performance counter events to be measured;
determining Nyquist sampling frequency for each performance counter event;
determining schedule for measuring performance counter events using the Nyquist sampling frequency for each performance counter event;
conducting performance counter event measurements in accordance with the schedule for measuring performance counter events, whereby the measurements yield a set of sample data for each measured performance counter event;
applying a signal reconstruction algorithm to the set of sample data for each measured performance counter event to reconstruct a respective essentially complete signal for each measured performance counter event; and using the essentially complete signal for each measured performance counter event to improve either a design or a utilization of either a microprocessor or an application to be executed on the microprocessor.

2. A method for optimizing performance counter utilization as recited in claim 1, further comprising:
storing the essentially complete signal for each measured performance counter event in a computer readable memory space.

3. A method for optimizing performance counter utilization as recited in claim 1, wherein the Nyquist sampling frequency for a given performance counter event is at least twice an anticipated number of changes in gradient direction of the complete signal for the given performance counter event per second.

4. A method for optimizing performance counter utilization as recited in claim 1, wherein a number of performance counter events to be measured exceeds a number of performance counter registers available for use in performing the performance counter event measurements.

5. A method for optimizing performance counter utilization as recited in claim 4, wherein the schedule for measuring performance counter events is determined based on the performance counter events to be measured and the number of performance counter registers available for use so as to ensure that the performance counter events to be measured are cycled through the available performance counter registers such that the performance counter events to be measured are permuted over a set of all possible performance counter event combinations that can be simultaneously measured given the number of available performance counter registers.

6. A method for optimizing performance counter utilization as recited in claim 1, wherein the schedule for measuring performance counter events is determined to ensure that each performance counter event is sampled at a rate greater than or equal its Nyquist sampling frequency.

7. A method for optimizing performance counter utilization as recited in claim 1, wherein the schedule for measuring the performance counter events is determined such that each performance counter event is measured in an irregular temporal sequence.

8. A method for optimizing performance counter utilization as recited in claim 1, wherein the signal reconstruction algorithm is defined to reconstruct a band-limited signal from a set of irregularly sampled signal data points.

9. A method for optimizing performance counter utilization as recited in claim 8, wherein the signal reconstruction algorithm is a Voronoi-Allebach signal reconstruction algorithm.

10. A method for optimizing performance counter utilization as recited in claim 8, wherein the signal reconstruction algorithm is either a Marvasti signal reconstruction algorithm or an adaptive weights signal reconstruction algorithm.

11. A computer readable medium having program instructions stored thereon for optimizing performance counter utilization, comprising:
program instructions for enabling specification of performance counter events to be measured;
program instructions for enabling specification of a Nyquist sampling frequency for each performance counter event;
program instructions for determining a schedule for measuring performance counter events using the Nyquist sampling frequency for each performance counter event;
program instructions for conducting performance counter event measurements in accordance with the schedule for measuring performance counter events, whereby the measurements yield a set of sample data for each measured performance counter event;
program instructions for applying a signal reconstruction algorithm to the set of sample data for each measured performance counter event to reconstruct respective essentially complete signal for each measured performance counter event; and
program instructions for storing the essentially complete signal for each measured performance counter event in a computer readable memory space.

12. A computer readable medium as recited in claim 11, wherein the essentially complete signal for each measured performance counter event is suitable for use in improving either a design or a utilization of either a microprocessor or an application to be executed on the microprocessor.

13. A computer readable medium as recited in claim 11, wherein the Nyquist sampling frequency for a given performance counter event is at least twice an anticipated number of changes in gradient direction of the complete signal for the given performance counter event per second.

14. A computer readable medium as recited in claim 11, wherein a number of performance counter events to be measured exceeds a number of performance counter registers available for use in performing the performance counter event measurements.

15. A computer readable medium as recited in claim 14, wherein the program instructions for determining the schedule for measuring performance counter events are defined based on the performance counter events to be measured and the number of performance counter registers available for use so as to ensure that the performance counter events to be measured are cycled through the available performance counter registers such that the performance counter events to be measured are permuted over a set of all possible performance counter event combinations that can be simultaneously measured given the number of available performance counter registers.

16. A computer readable medium as recited in claim 11, wherein the program instructions for determining the schedule for measuring performance counter events are defined to ensure that each performance counter event is sampled at a rate greater than or equal its Nyquist sampling frequency.

17. A computer readable medium as recited in claim 11, wherein the program instructions for determining the schedule for measuring the performance counter events are defined to ensure that each performance counter event is measured in an irregular temporal sequence.

18. A computer readable medium as recited in claim 11, wherein the signal reconstruction algorithm is defined to reconstruct a band-limited signal from a set of irregularly sampled signal data points.

19. A computer readable medium as recited in claim 18, wherein the signal reconstruction algorithm is a Voronoi-Allebach signal reconstruction algorithm.

20. A computer readable medium as recited in claim 18, wherein the signal reconstruction algorithm is either a Marvasti signal reconstruction algorithm or an adaptive weights signal reconstruction algorithm.

* * * * *